United States Patent [19]
Karlow et al.

[11] Patent Number: 5,533,750
[45] Date of Patent: Jul. 9, 1996

[54] SIMPLIFIED INFLATABLE RESTRAINT MODULE

[75] Inventors: James P. Karlow, Milford; James M. Kumkoski, Clarkston; Mohamed Boumarafi, Rochester Hills; Jonathan P. Hurford, Lake Orion, all of Mich.

[73] Assignee: Takata, Inc., Auburn Hills, Mich.

[21] Appl. No.: 456,568

[22] Filed: Jun. 1, 1995

[51] Int. Cl.⁶ ................................................ B60R 21/18
[52] U.S. Cl. ................................ 280/730.2; 280/728.2
[58] Field of Search ........................... 280/730.1, 730.2, 280/728.2

[56] References Cited

U.S. PATENT DOCUMENTS

| | | | |
|---|---|---|---|
| 4,915,410 | 4/1990 | Bachelder | 280/732 |
| 4,946,191 | 8/1990 | Putsch | 280/730.2 |
| 4,964,654 | 10/1990 | Bishop et al. | 280/743.1 |
| 4,966,388 | 10/1990 | Warner et al. | 280/730.2 |
| 5,112,079 | 5/1992 | Haland et al. | 280/730.2 |
| 5,121,941 | 6/1992 | Mihm et al. | 280/732 |
| 5,161,821 | 11/1992 | Curtis | 280/730.2 |
| 5,186,492 | 2/1993 | Wright et al. | 280/743.1 |
| 5,224,733 | 7/1993 | Simsic | 280/730.2 |
| 5,251,931 | 10/1993 | Semchena et al. | 280/730.2 |
| 5,290,084 | 3/1994 | Sinnhuber | 280/730.2 |
| 5,308,108 | 5/1994 | Rion | 280/728.2 |
| 5,324,072 | 6/1994 | Olson et al. | 280/730.2 |
| 5,348,342 | 9/1994 | Haland et al. | 280/730.2 |
| 5,364,125 | 11/1994 | Brown et al. | 280/730.2 |

FOREIGN PATENT DOCUMENTS 5-105020  4/1993  Japan.

*Primary Examiner*—Kenneth R. Rice
*Attorney, Agent, or Firm*—Harness, Dickey & Pierce

[57] ABSTRACT

An inflatable restraint module especially adapted for seat mounted side impact protection. The restraint module incorporates a retainer bracket with projecting deformable tab fingers which are loaded inside the bag through an access slit. Slots on opposite sides of the access slit are overlapped and placed such that the retainer bracket tab fingers extend through them. A sheet metal mounting bracket is then installed over the air bag. A cylindrical inflator is installed through holes formed in the mounting bracket and air bag into the interior cavity of the retainer bracket. This sub-assembly can be mounted into a plastic housing having slots which permit the tab fingers to extend to the exterior of the housing where they can be deformed to interlock the components in an assembled condition.

15 Claims, 4 Drawing Sheets

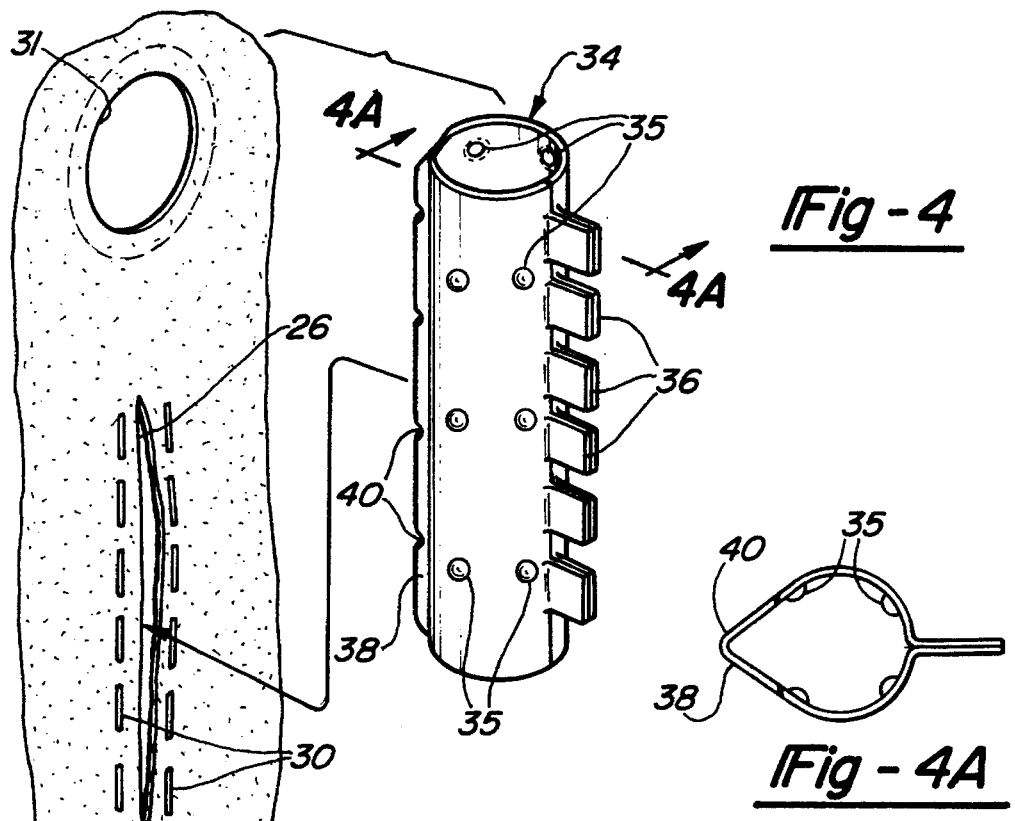
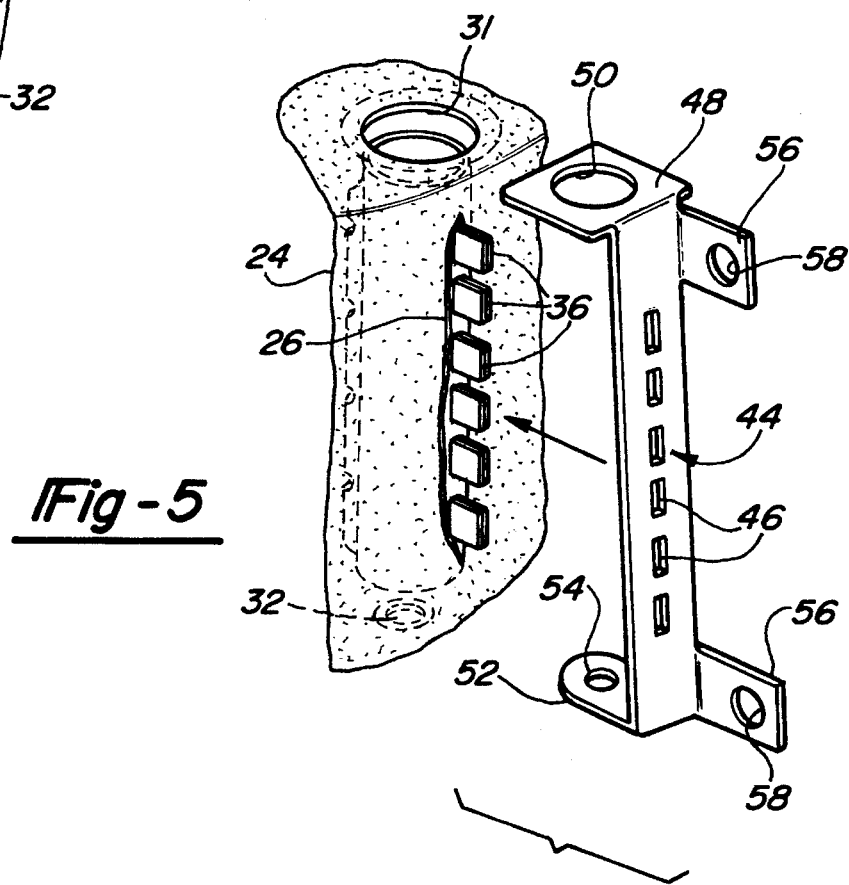

SIMPLIFIED INFLATABLE RESTRAINT MODULE

BACKGROUND AND SUMMARY OF THE INVENTION

This invention relates to an automotive safety device and particularly to an inflatable restraint module adapted for frontal or side impact protection featuring design and assembly improvements.

Inflatable restraint systems are now in widespread use in motor vehicles today. These systems incorporate a crash sensor which detects the onset of a vehicle collision and sends a triggering signal to the inflatable restraint module. A source of gas is activated in response to a crash signal to inflate a fabric air cushion which is presented to absorb impact energy of the occupant within the vehicle. Such inflatable restraint systems are found mounted to steering wheels for driver-side protection, or mounted to instrument panel structure to provide protection for front seat passengers. These systems have, been found to provide excellent occupant crash protection particularly when used with a belt type restraint system. Aiding in providing occupant protection for frontal impacts is the significant amount of deformable structure in the forward portion of the typical automobile. Moreover, todays crash sensors for frontal impact provide reliable crash signals in a time period permitting deployment of the inflatable restraint system. These advantages are not available when designing inflatable restraint systems for side impact collisions. Statistically, side impact collisions are more likely to cause significant injury or death as compared with frontal impacts with similar impact energy. This is attributable to the limited amount of vehicle structure between the occupant and the outside body structure subject to side impact collisions, and perhaps also due to human biomechanism. However, there is a belief that inflatable restraints for side impact collisions can provide significant benefits. Accordingly, there is increased emphasis in designing inflatable restraint systems for side impact protection.

Numerous designs of inflatable restraint systems are available today. Despite the tremendous effort exerted in optimizing the design of these devices, there is a continuing need to improve the manufacturability, cost, and reliability of the systems. Of significant importance is a reduction in the number of separate components which must be assembled to build the inflatable restraint system. The existence of a multiplicity of parts has a negative cost effect, both in terms of part fabrication and assembly. In addition, packaging size is of great importance in the design of today's motor vehicles. To make efficient use of packaging volume in the automobile it is desirable to reduce the overall size of an air bag module. Moreover, efforts to achieve benefits in these areas must not sacrifice the performance of the restraint system.

In accordance with this invention, an improved inflatable restraint module is provided which is particularly adapted for side impact protection applications, but may also be implemented in other environments such as front seat passenger-side applications. The module uses a molded plastic housing using a single piece clamshell construction, the housing contains a cushion and an inflator, and utilizes two major metal structural components, a retainer bracket, and a mounting bracket which interlock using bent tab fingers to retain the other module components together. The assembly is completed by mounting an inflator which is inserted through apertures in the mounting bracket and in the cushion, and into the interior of the retainer bracket. The inflator is secured with a single nut which loads the structural parts and cushion in compression. The inflatable restraint module in accordance with this invention requires only two simple metal parts. This concept allows a cylindrical inflator to be mounted in a side impact air bag module without the traditional reaction container which adds mass and creates packaging constraints. The module assembly according to this invention also allows for the interchangeable use of either a solid pyrotechnic or hybrid inflator. For the pyrotechnic inflator, the retainer bracket and mounting bracket further serve as a heat shield and heat sink. When used with a hybrid inflator, the retainer bracket has a formed air distribution passage allowing the output gas to be equally distributed into the folded air cushion and reducing the possibility that the stress of localized high velocity gas discharge would degrade the air cushion.

Further objects, features and advantages of the invention will become apparent from a consideration of the following description and the appended claims when taken in connection with the accompanying drawings.

BRIEF DESCRIPTION OF THE DRAWINGS

FIG. 4 is a pictorial view showing the retainer bracket in an exploded position away from the air cushion.

FIG. 4A is a cross-sectional view taken along line 4—4 from FIG. 4.

FIG. 5 is a pictorial illustration of the retainer bracket mounted within the air cushion and showing the mounting bracket in an exploded away position.

DETAILED DESCRIPTION OF THE PREFERRED EMBODIMENT

Figure 1:
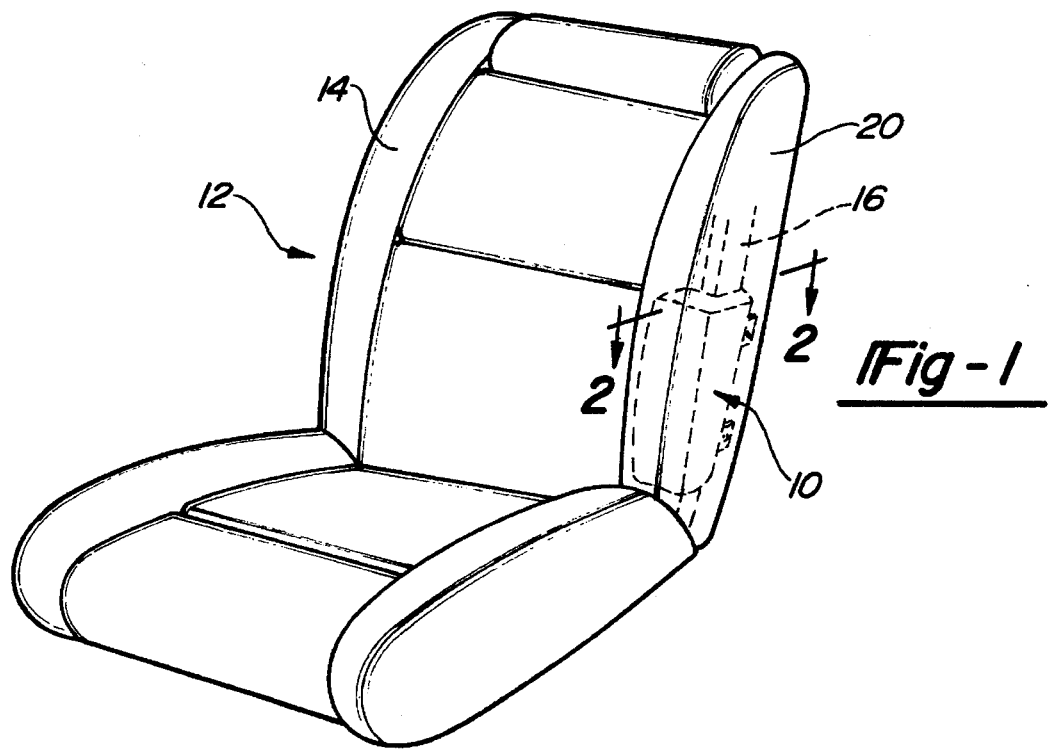
FIG. 1 is a pictorial view of a driver side motor vehicle front seat shown in phantom lines the internally mounted inflatable restraint module in accordance with this invention.
Figure 2:
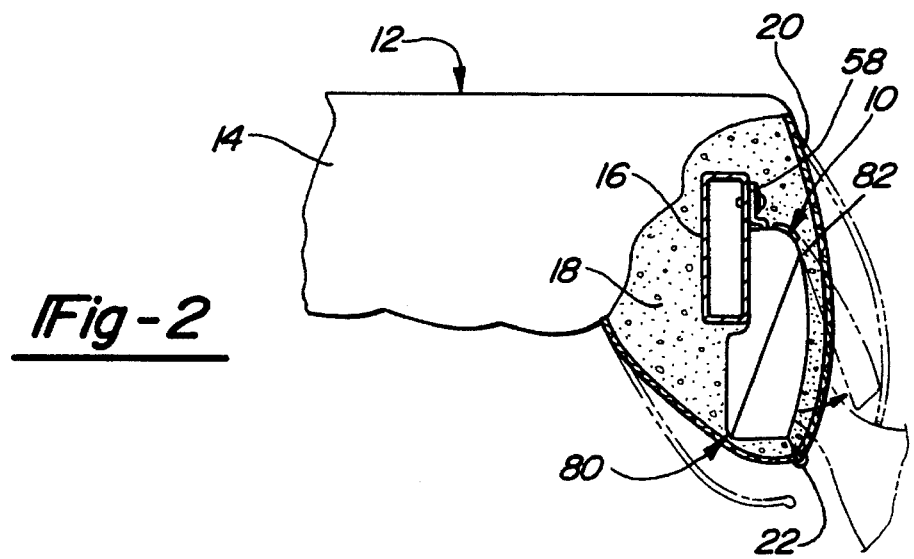
FIG. 2 is a cross-sectional view taken along line 2—2 of FIG. 1.
Figure 8:
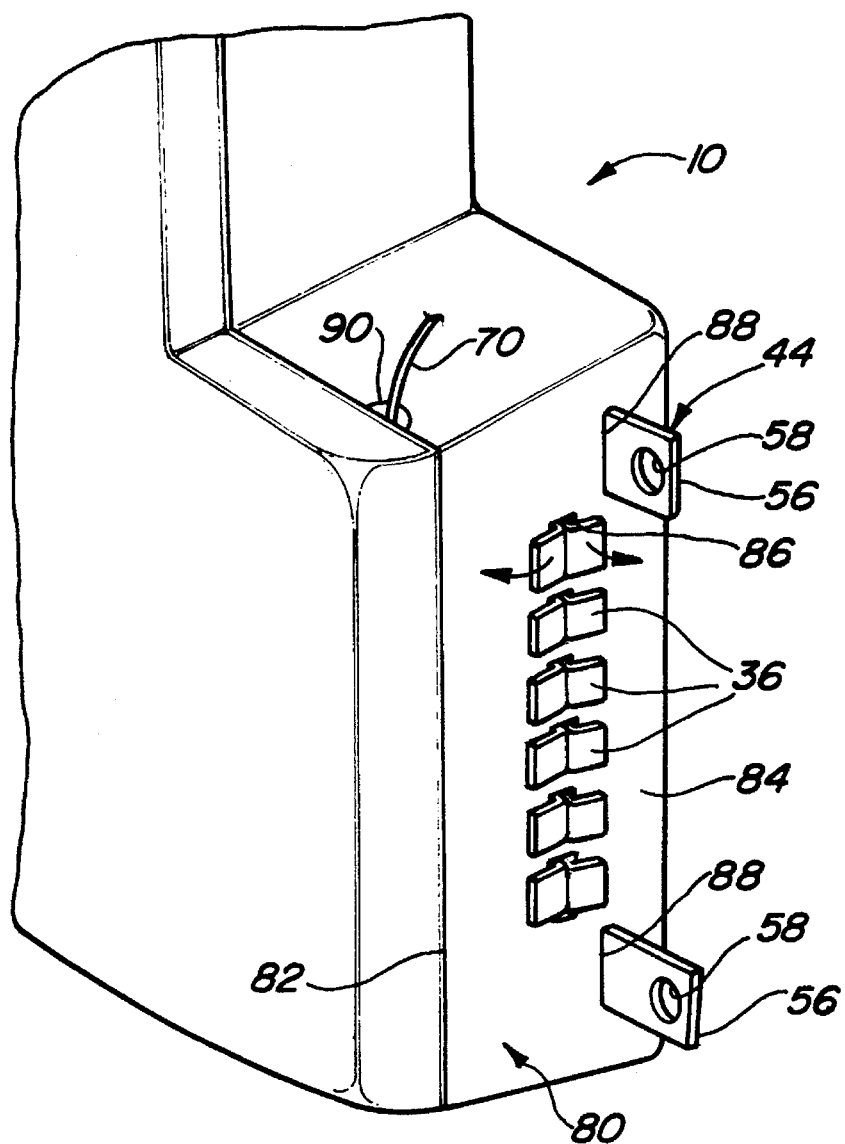
FIG. 8 shows complete assembly of the module enclosed by a plastic housing and showing the retainer bracket tab fingers deflected.

The inflatable restraint module in accordance with this invention is shown in a completely assembled condition in FIGS. 1, 2 and 8, and is generally designated by reference number 10. FIG. 1 illustrates inflatable restraint module 10 mounted within motor vehicle seat 12 which is shown as a driver-side seat. Inflatable restraint module 10 is mounted internally within seat back 14 and is fastened to a generally vertically extending seat back frame member 16. As shown in FIG. 2, inflatable restraint module 10 and seat frame 16 are surrounded by soft foam material 18 covered externally by trim 20. In accordance with conventional inflatable restraint design concepts, trim 20 features tear seam 22 which allows the trim to open to allow the air cushion within inflatable restraint module 10 to deploy.

Figure 3:
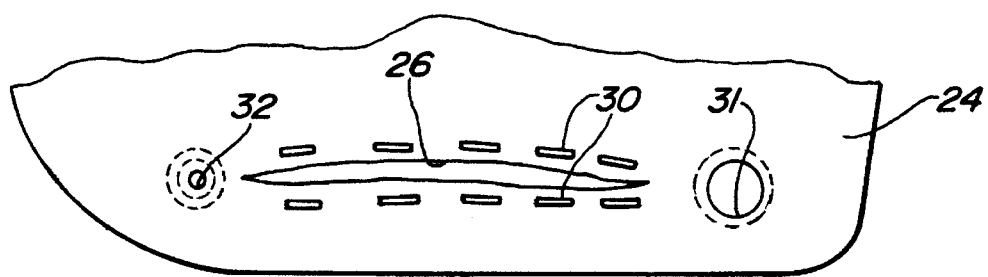
FIG. 3 is a partial view of an air cushion of the module of this invention showing the inflator assembly and mounting provisions.

The internal components of inflatable restraint module 10 are shown in FIGS. 3 through 8. These components will first be described in terms of their structural features, followed by a discussion of their assembly, cooperation, and operation during deployment.. With reference to FIG. 3, air cushion 24 is shown which can be formed of various materials conventionally used for forming air cushions, for example polyester or nylon weaved materials. The material forming air cushion 24 can be coated or uncoated to provide the desired inflation gas leakage characteristics. FIG. 3 illustrates a portion of air cushion 24 which provides an access opening for the mounting for additional components of the restraint module. Air cushion 24 defines cushion mouth 26 in the form of an elongated slit extending along an axis. Located on the axis of mounting bracket slit 26 is a larger reinforced opening 31 at one end:, and a smaller reinforced opening 32 at the other. On opposing lateral sides of slit 26 are a series of slots 30. All of the openings within air cushion 24 are preferably reinforced with sewn together multiple thicknesses of fabric materia.

Retainer bracket element 34 is best described with reference to FIGS. 4 and 4A. Retainer bracket 34 is preferable made of formed (eg. stamped) mild steel such as SAE 1008 or 1010 grades, and may have a thickness of, for example, 0.8 mm. Retainer bracket 34 is formed to a generally cylindrical configuration as illustrated in FIG. 4A with a series of projecting tab fingers 36 which meet together as shown. The generally circular cross-sectional shape of retainer bracket 34 provides a hollow interior which receives an inflator as will be explained below. Retainer bracket 34 also define a longitudinal ridge, 38 which forms a plenum for the distribution of inflation gases. Ridge 38 also has a series of apertures 40 which provide passageways for the discharge of inflation gases. Retainer bracket 34 can also define inwardly deformed dimples 35 which support the inflator and create a small air gap between the inflator when it is installed and the inside surface of the retainer bracket for insulation from heat soak back.

Mounting bracket element 44 is best described with reference to FIG. 5. Mounting bracket 44 is also made of mild steel such as 1008 or 1010 grade. Mounting bracket 44 defines a series of slots 46 which are oriented and of an appropriate dimension to receive and allow passage of tab fingers 36. Mounting bracket 44 defines at one end, flange 48 having large hole 50, and at the opposing end, flange 52 having small hole 54. Mounting tab projections 56 are formed by mounting bracket 44 and allow mounting of the restraint module by installing a fastener through mounting holes 58.

Inflator 62 is best described with reference to FIG. 6 and is a generally cylindrical type inflator of a design similar to that found in frontal impact passenger-side inflatable restraint modules. Inflator 62 can be a pyrotechnic or a so-called "hybrid" type having an internal compressed volume of gas supplemented by a pyrotechnic charge. Inflator 62 as shown in the Figures is of the hybrid variety. Inflator 62 includes an enlarged diameter rim 64 at one end, and at the opposing end, projecting threaded stud 66. Inflator nozzle 68 provide discharge openings through which the inflation gases pass upon deployment. Washer 65 is provided at the base of stud 66 and has a diameter less than that of rim 64. Signal wire 70 extends from inflator 62 and controls deployment of module 10.

Figure 7:
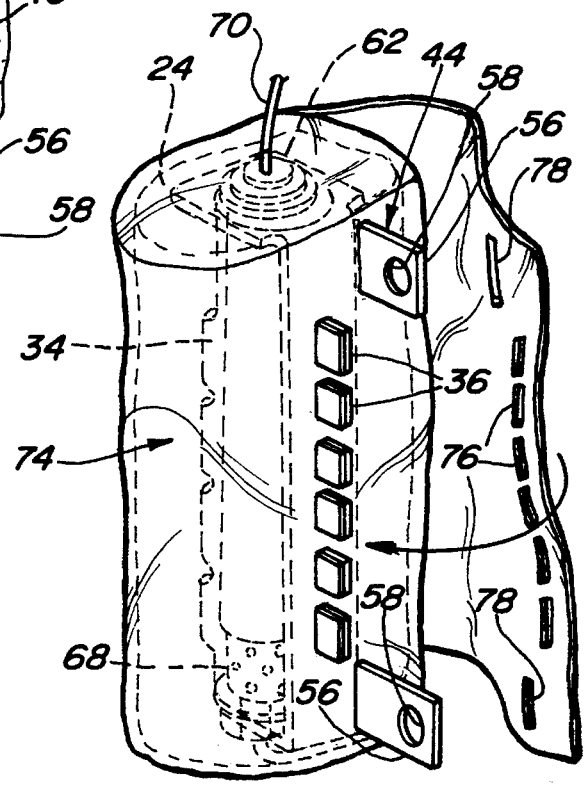
FIG. 7 shows the assembly with a protective sheet wrap being installed around it.

Sheet 74 as shown in FIG. 7 is a sheet of material such as "Tyvek" which has, at opposing edges, slots 76 which correspond with retainer bracket tab fingers 36, and slots 78 corresponding with mounting bracket mounting tab projections 56.

Plastic housing 80 is shown in FIGS. 2 and 8 and is a molded plastic case of clamshell configuration which opens along hinge line 82. Housing 80 defines an enclosed volume which contains the remaining element of restraint module 10. Housing 80 defines wall 84 having a series of apertures 86 for receiving retainer bracket tab fingers 36, and apertures 88 for receiving mounting bracket tab projections 56. Hole 90 provides for passage of signal wire 70. Housing 80 is normally maintained in a closed configuration as shown in full lines in FIGS. 2 and 8. However, upon deployment it opens along hinge line 82 to allow air cushion 24 to be inflated and erupt from seat back 14 as is shown in phantom lines in FIG. 2.

Assembly of the components of inflatable restraint module 10 will now be explained with reference to FIGS. 4 through 8. As shown in FIG. 4, retainer bracket 34 is installed inside the interior volume of air cushion 24 through slit 26. The free edges of fabric of the air cushion along slit 26 are overlapped such that slots 30 on opposing sides of slit 46 are in registry. Next, retainer bracket tab fingers 36 are pushed through the overlapped slots 30 to extend exteriorly of the air cushion interior volume.

As shown in FIG. 5, once retainer bracket 34 is installed within air cushion 24, the air cushion fabric can be folded such that air cushion large hole 31 overlaps one open end of the retainer bracket, whereas small air cushion hole 32 is aligned with the interior cavity at the opposite end. Next, mounting bracket 44 is put into position such that retainer bracket tab fingers 36 extend through mounting bracket slots 46. In this position, the fabric of air cushion 24 in the areas of large hole 31 and small hole 32 pass between the ends of retainer bracket 34 and mounting bracket 44. Air cushion holes 31 and 32 are positioned so that they line up with mounting bracket large hole 50 and small hole 54.

Figure 6:
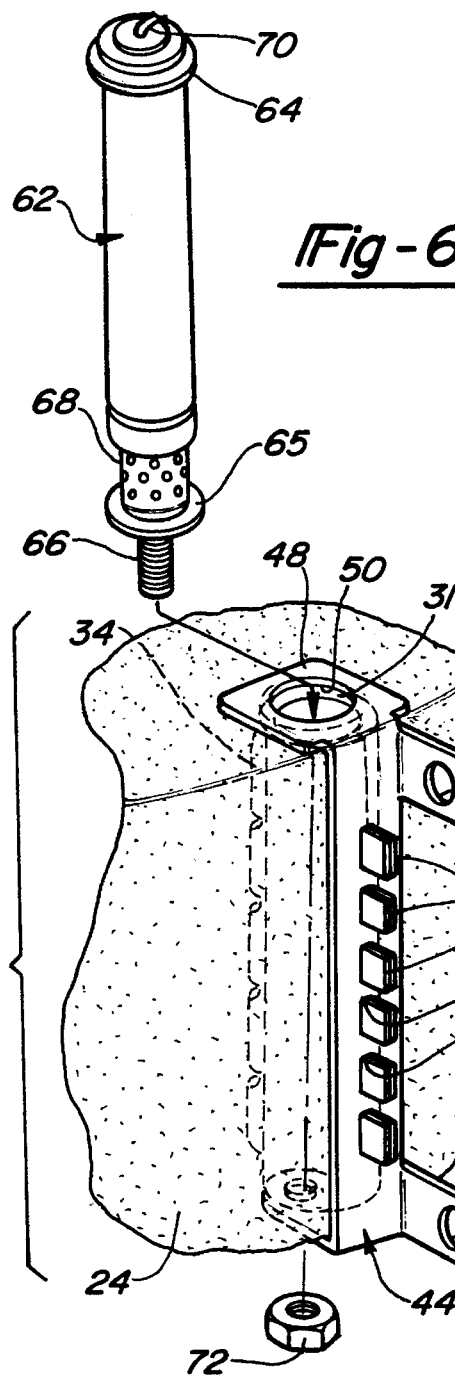
FIG. 6 is a pictorial view of the assembly showing installation of the inflator.
Figure 6A:
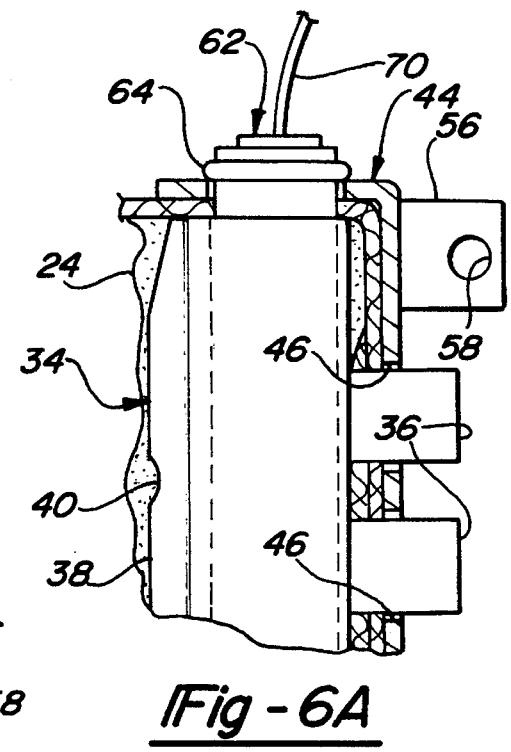
FIG. 6A is a partial view taken from FIG. 6 partially in elevation and partially in elevation showing the assembled configuration of the inflator mounted to other components of the air cushion assembly.

As shown in FIG. 6, inflator 62 is assembled by passing threaded stud end 66 through mounting bracket large hole 50 and air cushion large hole 31. The threaded end stud 66 of the inflator then passes through air cushion small hole 32 and mounting bracket small hole 54. Travel of inflator 62 into the structure and cushion is limited by inflator rim 64 which cannot pass through mounting bracket hole 50. A retaining nut 72 is installed on inflator threaded stud 66 which pulls inflator 62 further inward, allowing inflator rim 64 to further compress and retain the assembly. In addition, washer 65 compresses the air bag fabric at the lower end of the assembly. This compression not only secures the components together but also prevents unwanted gas leakage from holes 31 and 32 of the air cushion at the ends of inflator 62. FIG. 6A shows the sub-assembly in the condition after installation of inflator 62. As illustrated, tab fingers 36 extend externally through mounting bracket 44.

FIG. 7 illustrates sheet 74 being wrapped around the sub-assembly with air cushion 24 in a folded configuration. One series of slots 76 along one edge of sheet 74 are placed over tab fingers 36, and slots 78 over mounting bracket tab projections 56. Sheet 74 is then wrapped around the folded bag and its free opposite edge is placed over the same projections. Sheet 74 maintains air cushion 24 in a folded condition and protects assembly from contamination and mechanical damage.

FIG. 8 illustrates the final step of assembly in which the sub-assembly of FIG. 7 is installed within plastic housing 80 with projecting tab fingers 36 and mounting bracket tab projections 56 extending through aligned apertures 86 and 88. After that step is completed, tab fingers 36 are spread apart as shown in FIG. 8, interlocking the components of the assembly in an assembled condition. Finally, the inflatable restraint module can be mounted to appropriate vehicle structure such as is shown in FIGS. 1 and 2 where it is mounted to seat back frame member 16 using fasteners.

Inflatable restraint module 10 would be used in conjunction with an appropriate crash sensor for generating a deployment signal. In the deployment sequence, inflator 62 is initiated by an electrical signal through signal wire 70. The inflator 62 begins to produce gas, through a pyrotechnic reaction or the release of compressed stored gas, or both. The discharging gas begins to flow into the plenum created by the space between inflator 62 and retainer bracket ridge 38. Gas flows through apertures 40 into the folded air cushion 24. The interior volume of air cushion 24 begins to fill which opens housing 80 and allows the expanding cushion to pass into seat 12. The expanding air cushion then burst through seat trim 20 and into position between the driver and the door interior trim to provide impact protection.

As mentioned previously, module 10 could also be adapted for front seat passenger-side protection by enlarging the components to fulfill the larger gas volume needed for that application.

It is to be understood that the invention is not limited to the exact construction illustrated and described above, but that various changes and modifications may be made without departing from the spirit and scope of the invention as defined in the following claims.

We claim:

1. An inflatable restraint module comprising:

an air cushion defining an interior volume and defining an elongated slit extending along an axis with slots formed though said air cushion adjacent both sides of said slit, and an aperture generally aligned with said axis at an end of said slit, a generally cylindrical retainer bracket defining a hollow interior with an opened end and further defining a plurality of projecting tab fingers, said air cushion slit allowing said retainer bracket to be inserted within said air cushion interior volume and said air cushion slots cooperating with said tab fingers to allow said tab fingers to extend through said slots thereby closing said air cushion slit said tab fingers extending exteriorly of said air cushion interior volume with said air cushion aperture oriented to overly said retainer bracket end, a mounting bracket having a series of slots configured to receive said retainer bracket tab fingers and having opposing end flanges with at least one of said flanges having an aperture, said end flanges oriented to overly and embrace said retainer bracket whereby said retainer bracket fingers may be deformed to retain in an assembled condition said air cushion, said retainer bracket, and said mounting bracket, and a cylindrical inflator received by said retainer bracket interior by passing through said air cushion aperture and said mounting bracket aperture.

2. An inflatable restraint module according to claim 1 further comprising said retainer bracket forming at least one mounting tab enabling said module to be mounted to a vehicle structure member.

3. An inflatable restraint module according to claim 1 further comprising said retainer bracket forming a longitudinal ridge and apertures for distributing and discharging inflation gases into said air cushion interior volume.

4. An inflatable restraint module according to claim 1 further comprising said retainer bracket forming local inwardly extending surfaces for contacting said inflator.

5. An inflatable restraint module according to claim 1 further comprising said inflator having a radially projecting rim adjacent one end thereof of a configuration which prevents said rim from passing through said mounting bracket aperture.

6. An inflatable restraint module according to claim 5 further comprising said inflator having a threaded stud projecting from an opposite end of said inflator and said rim and said stud cooperating to clamp together said air cushion, said retainer bracket, and said mounting bracket.

7. An inflatable restraint module according to claim 1 further comprising a sheet having opposing edges with apertures adjacent said edges for engaging with said tab fingers to wrap around said air cushion to maintain said air cushion in a folded configuration.

8. An inflatable restraint module according to claim 1 further comprising a housing for receiving said air cushion, said retainer bracket, said mounting bracket, and said inflator, and defining apertures for receiving said tab fingers.

9. An inflatable restraint module comprising:

an air cushion defining an interior volume and defining an elongated slit extending along an axis with slots formed though said air cushion adjacent both sides of said slit, and first and second apertures generally aligned with said axis at opposite ends of said slit, a generally cylindrical retainer bracket defining a hollow interior with opposite opened ends and further defining a plurality of projecting tab fingers, said air cushion slit allowing said retainer bracket to be inserted within said air cushion interior volume and said air cushion slots cooperating with said tab fingers to allow said tab fingers to extend through said slots thereby closing said slit, said tab fingers extending exteriorly of said air cushion interior volume with said air cushion first and second apertures oriented to overly said retainer bracket ends, a mounting bracket having a series of slots configured to receive said retainer bracket tab fingers and having opposing first and second end flanges with first and second apertures respectively, said end flanges oriented to overly and embrace said retainer bracket opened ends whereby said retainer bracket fingers may be deformed to retain in an assembled condition said air cushion, said retainer bracket and said mounting bracket, and a cylindrical inflator having a radially extending rim adjacent one end thereof and threaded fastener means at the opposite end thereof said inflator received by said retainer bracket interior by passing through said first air cushion aperture and said first mounting bracket aperture wherein said inflator rim causes said inflator to engage said first mounting bracket end flanges and through engagement of said threaded means passing through said second end flange apertures compressing said air cushion against said retainer bracket ends.

10. An inflatable restraint module according to claim 9 further comprising said retainer bracket forming at least one mounting tab enabling said module to be mounted to a vehicle structure member.

11. An inflatable restraint module according to claim 9 further comprising said retainer bracket forming a longitudinal ridge and apertures for distributing and discharging inflation gases into said air cushion interior volume.

12. An inflatable restraint module according to claim 9 further comprising said retainer bracket forming local inwardly extending surfaces for contacting said inflator.

13. An inflatable restraint module according to claim 9 further comprising a sheet having opposing edges with apertures adjacent said edges for engaging with said tab fingers to wrap around said air cushion to maintain said air cushion in a folded configuration.

14. An inflatable restraint module according to claim 9 further comprising a housing for receiving said air cushion, said retainer bracket, said mounting bracket, and said inflator, and defining apertures for receiving said tab fingers.

15. A method of assembling an inflatable restraint module comprising the steps of:

providing an air cushion defining an interior volume and defining an elongated slit extending along an axis with slots formed though said air cushion adjacent both sides of said slit, and an aperture generally aligned with said axis at an end of said slit, providing a generally cylindrical retainer bracket defining a hollow interior with an opened end and further defining a plurality of projecting tab fingers, providing a mounting bracket having a series of slots configured to receive said retainer bracket tab fingers and having opposing end flanges with at least one of said flanges having an aperture, providing a cylindrical inflator, inserting said retainer bracket inside said air cushion interior volume through said slit and placing said air cushion slots over said tab fingers to allow said tab fingers to extend through said slots and extend exteriorly of said air cushion interior volume and causing said slit to be enclosed and orienting said air cushion aperture to overly said retainer bracket end, affixing said mounting bracket to said retainer bracket with said end flanges oriented to overly and embrace said retainer bracket, deforming said retainer bracket fingers to retain in an assembled condition said air cushion, said retainer bracket, and said mounting bracket, and inserting said inflator inside said retainer bracket interior by passing said inflator through said air cushion aperture and said mounting bracket aperture.

* * * * *